United States Patent
Ando

(10) Patent No.: US 8,690,672 B2
(45) Date of Patent: Apr. 8, 2014

(54) MEDIA REPRODUCTION DEVICE

(75) Inventor: Takehiro Ando, Tokyo (JP)

(73) Assignee: Square Enix Co., Ltd., Tokyo (JP)

( * ) Notice: Subject to any disclaimer, the term of this patent is extended or adjusted under 35 U.S.C. 154(b) by 64 days.

(21) Appl. No.: 13/054,980

(22) PCT Filed: Jan. 23, 2009

(86) PCT No.: PCT/JP2009/051056
§ 371 (c)(1),
(2), (4) Date: Jan. 20, 2011

(87) PCT Pub. No.: WO2010/016283
PCT Pub. Date: Feb. 11, 2010

(65) Prior Publication Data
US 2011/0124412 A1 May 26, 2011

(30) Foreign Application Priority Data
Aug. 8, 2008 (JP) ................. 2008-204947

(51) Int. Cl.
*A63F 13/02* (2006.01)

(52) U.S. Cl.
CPC ......... *A63F 13/02* (2013.01); *A63F 2300/6063* (2013.01); *A63F 2300/8047* (2013.01)
USPC .......................................... 463/35

(58) Field of Classification Search
CPC ............... A63F 2300/8047; A63F 2300/5533; A63F 2300/554; A63F 2300/5546; A63F 2300/572; A63F 2300/6063; A63F 2300/6081; A63F 2300/63; A63F 2300/632; A63F 2300/208; A63F 2300/535; A63F 2300/206; A63F 2300/207; A63F 2009/247; A63F 2009/2476; A63F 2009/2477; A63F 2009/2479; A63F 13/02
USPC ................. 463/30, 31, 35, 40–42, 43, 11–13, 463/17–19, 16, 20, 25, 26–28, 29
See application file for complete search history.

(56) References Cited

U.S. PATENT DOCUMENTS

| | | | | |
|---|---|---|---|---|
| 4,710,873 A | * | 12/1987 | Breslow et al. | 463/31 |
| 5,393,072 A | * | 2/1995 | Best | 463/35 |
| 5,553,864 A | * | 9/1996 | Sitrick | 463/31 |
| 5,680,533 A | * | 10/1997 | Yamato et al. | 345/473 |
| 5,830,065 A | * | 11/1998 | Sitrick | 463/31 |
| 6,106,399 A | * | 8/2000 | Baker et al. | 463/42 |
| 6,352,432 B1 | * | 3/2002 | Tsai et al. | 434/307 A |
| 6,425,825 B1 | * | 7/2002 | Sitrick | 463/31 |
| 6,746,333 B1 | * | 6/2004 | Onda et al. | 463/43 |
| 6,857,960 B2 | * | 2/2005 | Okubo et al. | 463/35 |

(Continued)

FOREIGN PATENT DOCUMENTS

| | | |
|---|---|---|
| JP | 2003-230766 | 8/2003 |
| JP | 3573288 | 10/2004 |
| JP | 2006-524877 | 11/2006 |
| JP | 2008-142268 | 6/2008 |

*Primary Examiner* — David L Lewis
*Assistant Examiner* — Matthew D Hoel
(74) *Attorney, Agent, or Firm* — Duane Morris LLP

(57) ABSTRACT

It is possible to generate a game element in accordance with the customization state of a media reproduction device, which exhibits a uniqueness of user. Provided is a media reproduction device which acquires related attribution information from stored media data, selects an object corresponding to the attribution information from a list, and generates the object during a game.

6 Claims, 5 Drawing Sheets

(56) References Cited

U.S. PATENT DOCUMENTS

| | | | |
|---|---|---|---|
| 6,878,067 B2* | 4/2005 | Blanco | 463/43 |
| 6,947,044 B1* | 9/2005 | Kulas | 345/473 |
| 7,137,892 B2* | 11/2006 | Sitrick | 463/31 |
| 7,338,373 B2* | 3/2008 | Kawamura | 463/35 |
| 2001/0007542 A1* | 7/2001 | Fukuda | 369/24 |
| 2001/0036859 A1* | 11/2001 | Yokoi | 463/30 |
| 2002/0028710 A1* | 3/2002 | Ishihara et al. | 463/44 |
| 2002/0077182 A1* | 6/2002 | Swanberg et al. | 463/43 |
| 2002/0198045 A1* | 12/2002 | Okubo | 463/29 |
| 2003/0148811 A1* | 8/2003 | Sitrick | 463/31 |
| 2003/0190954 A1* | 10/2003 | Sitrick | 463/35 |
| 2003/0216179 A1* | 11/2003 | Suzuki et al. | 463/35 |
| 2004/0162139 A1* | 8/2004 | Blanco | 463/35 |
| 2004/0162140 A1* | 8/2004 | Blanco | 463/35 |
| 2005/0014543 A1* | 1/2005 | Itoi et al. | 463/8 |
| 2005/0026686 A1* | 2/2005 | Blanco | 463/35 |
| 2005/0026687 A1* | 2/2005 | Watanabe | 463/35 |
| 2005/0054441 A1* | 3/2005 | Landrum et al. | 463/35 |
| 2005/0067935 A1* | 3/2005 | Lee et al. | 313/309 |
| 2005/0159218 A1* | 7/2005 | Blanco | 463/35 |
| 2006/0058101 A1* | 3/2006 | Rigopulos | 463/35 |
| 2007/0155494 A1* | 7/2007 | Wells et al. | 463/35 |
| 2007/0218993 A1* | 9/2007 | Miyamoto | 463/35 |
| 2008/0045337 A1* | 2/2008 | Blanco | 463/35 |
| 2008/0188291 A1* | 8/2008 | Bonney et al. | 463/25 |

* cited by examiner (a)
```
PRODUCTION OF CHARACTER

● DESIGNATION OF MUSIC

○ RECOMMENDATION
```

(b)
```
    UNIQUE ID      NAME OF MUSIC
       001            AAAAA
  ⇒    002            BBBBB
       003            CCCCC
       004            DDDDD
```

(c)
UNIQUE ID : 002
NAME OF MUSIC : BBBBB B

DETERMINE ○          RETURN △

(d)

CHARACTER A1

| UNIQUE ID | CHARACTER(1) | CHARACTER(2) | CHARACTER(3) |
|---|---|---|---|
| 001 | A1 | A2 | A3 |
| 002 | B1 | B2 | B3 |
| 003 | C1 | C2 | C3 |
| 004 | D1 | D2 | D3 |
| . | . | . | . |
| . | . | . | . |
| . | . | . | . |
| . | . | . | . |

MEDIA REPRODUCTION DEVICE

CROSS-REFERENCE TO RELATED PATENT APPLICATIONS

The present application is a U.S. national stage application under 35 U.S.C. §371 of PCT Application No. PCT/JP2009/051056, filed Jan. 23, 2009, which claims priority to JP 2008-204947 filed on Aug. 8, 2008, the entireties of which are incorporated by reference herein.

TECHNICAL FIELD

The invention relates to a media reproduction device for reproducing music and playing games.

BACKGROUND ART

In the past, a media reproduction device for reproducing music and playing games, such as "a media player" disclosed in patent related document 1 shown below is known. Besides, there is a game as shown in patent related document 2 as shown below wherein game elements, such as items and characters, are produced according to operation of users during the game, and such a game is popular. Some people wish to play a game wherein objects can be produced even in a media reproduction device.
Patent related document 1: Patent application publication No. 2006-524877
Patent related document 2: Patent application publication No. 2008-142268

DISCLOSURE OF INVENTION

Problems to be Solved by Invention

Generally, a user enjoys such a customization that desired music is selected according to his (her) individuality and stored so as to make a music list of his (her) own in the media reproduction device. Then, it is preferable to produce the game element according to the state of customization of the media reproduction device even in the case where a game in which the game element is also produced is played in the media reproduction device. However, there is no concrete method for actualizing such a method in the prior art.

In order to make the media reproduction device through which a game can be also played, improving a computer function of the media reproduction device, as well as reproduction of music that is an original object for the media reproduction device, and to produce the game element, such as the character and the item, it is desired to operate the media reproduction device necessary for production of the game element as easy as possible and to make the operation of the media reproduction device similar to a normal operation of reproduction of music. In other words, if it is possible to produce the game element with a normal feeling of selecting music, user is not reluctant to play games with the media reproduction device and an opportunity of enjoying games can be increased.

In order to produce the game element according to the customization state of the media reproduction device by the user, it is necessary to judge a state of storing the music in the media reproduction device by the user, that is, which music is stored in the media reproduction device of the user and to prepare program for producing the game element matching the music, and such program is made complex and large-scale thereby. If the program for producing the game element is thus made large-scale, the original memory area for storing music is made narrower, and a longer time is taken for its procedure in a computer which processing power is small, such as the media reproduction device. Then, the original reproduction function of the media reproduction device may be damaged.

Under such situations, an object of the invention is to provide the media reproduction device in which game elements can be easily produced according to a customization state of the media reproduction device with feelings similar to usual selection of music and user's individuality can be easily produced thereby.

Another object of the invention is to provide the media reproduction device wherein it is possible to produce game elements even in a small computer, such as the media reproduction device, according to the user's customization state without burdens on the computer, and to extremely prevent an original reproduction function of the media reproduction device from being damaged.

The invention according to claim 1 that was made in order to solve the above-mentioned objects is a media reproduction device having a monitor for displaying an image, such as an image output portion 15 and a liquid crystal panel 3, a memory portion for storing media data, such as music data, moving image data, stationary image data, a reproduction output portion for outputting and reproducing the media data, such as a voice output portion 16 and a headphone 5, and an input operation portion, such as an operation panel 4 and an input portion 14, comprising:
  game proceeding control means, such as a game execution portion 17, for advancing a game, displaying an image on said monitor based upon an input command to be inputted through said input operation portion; and
  object storing means, such as a character storing portion 19, for storing an object usable in the game, such as a character and an item; and
  object production control means, such as a character producing portion 18, for controlling production of the object during game proceeding, said object production control means having:
    attribution information obtaining means, such as a media control portion 12, for obtaining attribution information, such as header information, relating to media data from said media data stored in said memory portion;
    object selection means, a character producing portion 18, for selecting the object corresponding to said attribution information from said object storing means; and
    display output means, such as an image output portion 15 and a liquid crystal panel 3, for outputting and displaying selected object on said monitor so as to produce in the game.

The invention according to claim 2 and claim 6 is the media reproduction device, wherein said memory portion stores a combination table showing a combination of said objects that correspond to said attribution information,
  said object selection means selects said object corresponding to said attribution information concerning some media data obtained by said attribution information obtaining means by referring to said combination table.

The invention according to claim 3 and claim 7 is the media reproduction device, further comprising combination table producing means, for controlling to change the combination between said attribution information and said object in said combination table with a passage of time, and to produce the combination table having a new combination.

The invention according to claim 4 is the media reproduction device, further comprising media data presentation means, for presenting two or more media data stored in said memory portion to a user so as to be selectable, wherein if a command of selecting some media data from said media data presented by said media data presentation means is inputted through said input operation portion, said attribution information obtaining means obtains said attribution information relating to said media data selected by said command from said media data stored in said memory portion.

The invention according to claim 5 is a media reproduction device having:

a monitor for displaying an image, a memory portion for storing media data, a reproduction output portion for outputting and reproducing the media data and an input operation portion;

media data presentation means, for displaying two or more media data stored in said memory portion, that is reproducible by said media reproduction device on said monitor as a list so as to be selectable for a user at the time of reproduction of the media data, and a media control portion that, if a command of selecting some media data from said media data presented by said media data presentation means is inputted through said input operation portion, reads the media data corresponding to the command out of said memory portion and can output and reproduce the media data through said reproduction output portion, said media data reproduction device comprising:

game proceeding control means, for advancing a game, displaying an image on said monitor based upon said input command to be inputted through said input operation portion;

object storing means, for storing an object usable in the game:

attribution information obtaining means that, if a command of selecting some media data from said media data presented by said media data presentation means is inputted through said input operation portion, obtains attribution information relating to said media data selected by said command from said media data stored in said memory portion;

object selection means, for selecting said object that corresponds to said attribution information relating to said media data obtained by said attribution information obtaining means from said object storing means; and display output means, for outputting and displaying said selected object on said monitor and producing said object in the game.

According to the invention of claim 1 having the above-mentioned structure, the object is produced in the game according to the attribution information of the media data, so that a state of customizing the media reproduction device by a user is reflected and the user's individuality can be exhibited thereby.

According to the invention of claim 2 and claim 6, the object corresponding to the attribution information can be rapidly checked and selected through the combination table.

According to the invention of claim 3 and claim 7, a combination between the attribution information and the object of the combination table is changed with a passage of time and thereby controlling to select a different object with a passage of time even if the media data is the same. Furthermore, it is possible to achieve various object selection results with a simple structure with no complex selection program, that is, with no burden on the computer of the media reproduction device.

According to the invention of claim 4, the user can select the media data from two or more media data that are presented.

According to the invention of claim 5, the media presentation means can be also used for the reproduction action of the media reproduction device and thereby simplifying the device. Besides, burdens on the computer of the media reproduction device can be reduced due to the simple structure thereof, and it is possible to extremely prevent an original reproduction function of the media reproduction device from being damaged.

BRIEF DESCRIPTION OF DRAWINGS

FIG. 5 is a view of an instance of a combination table.

EXPLANATION OF REFERENCE NUMBERS

1 . . . media reproduction device
17 . . . game execution portion
18 . . . character producing portion

BEST MODE FOR CARRYING OUT THE INVENTION

1. Structure of Media Reproduction Device

A media reproduction device in the invention is a device for storing and reproducing media data, such as music, moving images, stationary images, and its technical existence is a computer for storing and reproducing the media data. Concretely speaking, the media reproduction device is a music player, a game machine, a mobile phone, a PDA and a personal computer, for example.

Figure 1:
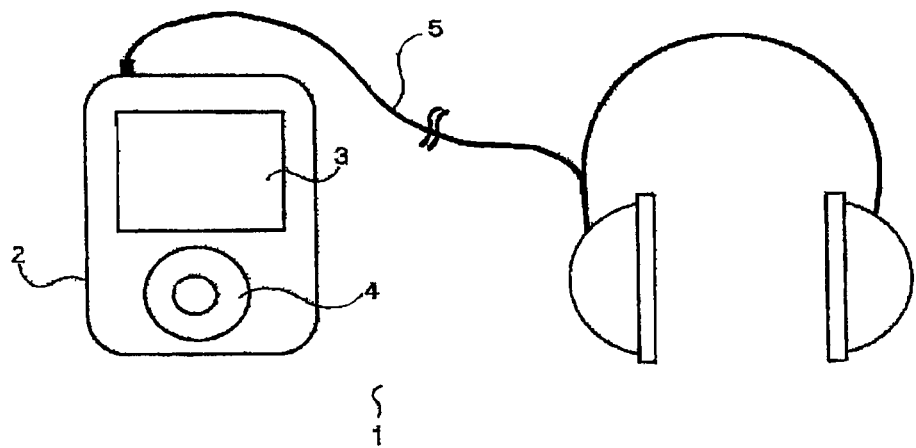
FIG. 1 is a typical view showing a media reproduction device that is an instance of the invention.

A media reproduction device 1 in the present embodiment has a casing 2 in the shape of a box which size is a hand of a person, and a liquid crystal panel 3 is positioned, appearing at a surface thereof, as shown in FIG. 1. Besides, an operation panel 4 is located on a side of a surface of the casing 2, being parallel to the liquid crystal panel 3 as a monitor. Inside the casing 2, electronic parts comprising a simple computer are provided, and an operating system for activating the computer and various application programs are provided therein. A headphone 5 for outputting voices is attachably and detachably connected with the side of the casing 2 (upper side of FIG. 1) through a connector or the like.

Figure 2:
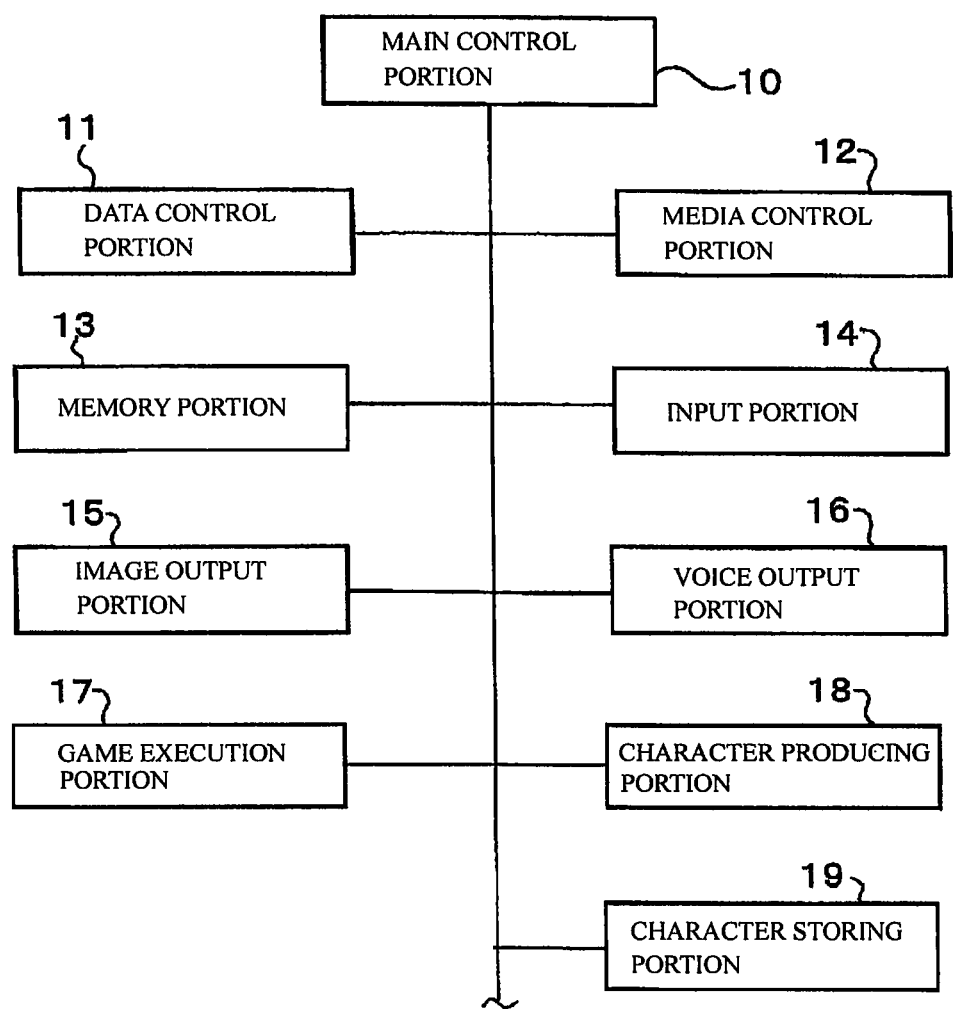
FIG. 2 is a block diagram for explaining the media reproduction device from functional aspects thereof.

Subsequently, a structure of the media reproduction device 1 is now mentioned from it's functional aspects, as shown in FIG. 2. The media reproduction device 1 has a main control portion 10, a data control portion 11, a media control portion 12, a memory portion 13, an input portion 14, an image output portion 15, a voice output portion 16, a game execution portion 17, a character producing portion 18, and a character storing portion 19 as structural elements to be formed by both hardware and software. The media reproduction device 1 is possible to transmit and receive programs and data to or from external devices that are the other computers through a cable connection or a network connection or by directly accessing a storage medium, such as a CD and a semiconductor memory.

2. Structure of Game Program

Game program is a program through which a computer, such as the media reproduction device, plays games, and is a program for controlling to produce game elements during proceeding of a game. The applicable games are role playing games, adventure games, action games, simulation games, puzzle games and the other various games. Game elements are items, characters and the other various kinds of objects to be used in the game, for example. The game program in the embodiment can produce characters that can be used in the game through operations of a user, mentioned later. A concrete structure of the game program is mentioned hereinafter in an explanation of operations as a matter of convenience of explanations and understanding.

3. Explanation of Operations

3-1. Storing and Reproducing of Media Data

The data control portion 11 of the media reproduction device 1 is possible to capture data from the outside through a connection with the external device via a cable (not shown) or through the storage medium, such as a memory card, and to store such data in the memory portion 13, such as a hard disc drive or a semiconductor memory. The media control portion 12 controls the media data, such as music data, moving image data, stationary image data of the data stored in the memory portion 13. For example, when the user operates the operation panel 4, a predetermined selection command is outputted to the input portion 14 from the operation panel 4, and the input portion 14 receives the selection command, and the media control portion executes procedures, such as selection or reproduction of the media data. When executing the procedure, a proper screen is outputted and displayed to and on the liquid crystal panel 3 through the image output portion 15 in order to instruct and confirm operations. At the time of reproducing the media data, music or images are outputted to the headphone 5 or the liquid crystal panel 3 through the voice output portion 16 or the image output portion 15.

Figure 3:
FIG. 3 are views of instances of screens.
Figure 3:
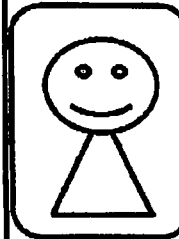

More concretely speaking, when the user reproduces music stored in the media reproduction device 1 with the media reproduction device 1 and enjoys the music through the headphone 5, the operation panel 4 is firstly operated so as to display a selection guidance screen, as shown in FIG. 3(*a*) (FIG. 3(*a*) is a character producing screen that will be mentioned later, but explanation is made, referring to FIG. 3 as a matter of convenience since the selection screen of the media data is the same as FIG. 3 although it has no display "production of character". Such a selection guidance screen is for selecting whether music is selected by manually operating the operation panel 4 through the user or by automation through the media reproduction device. If a command "designation of music" in the figure is selected through the operation of the operation panel 4, selection of music by manual operation of the operation panel 4 through the user is instructed to the media control portion 12 through the input portion 14, and if "recommendation" is selected, automatic selection of music according to a predetermined music selection program by the media control portion 12 is instructed to the media control portion 12.

If the user instructs the media control portion 12 to manually select music by selecting a command "designation of music", the media control portion 12 reads the music selectable by the user, that is, the music reproducible through the media reproduction device 1 out of the media data stored in the memory portion 13 that will be mentioned after as the reproduction music data which is comprised of a music identification number, such as the unique ID, and the corresponding music name, and displays respective music selectable by the user through the operation panel 4 on the display portion 3, such as the liquid crystal panel 3 through the image output portion 15 in the shape of a list, as shown in FIG. 3(*b*).

If the user selects some music out of the list of reproducible music displayed on the display portion 3 through the operation panel 4 as shown by an arrow in FIG. 3(*b*) in the above-mentioned state, a corresponding selection command is outputted to the media control portion 12, and the media control portion 12 judges the unique ID of the music selected by the user that is shown in the selection command. Based upon the judged unique ID, music data that corresponds to the unique ID is read out of the memory portion 13 and the music corresponding to the music data is outputted from the headphone 5 through the voice output portion 16 so as to provide the user. Thus, the operation of reproducing the music data is done.

If the user selects "recommendation" in FIG. 3(*a*), the reproduction operation is done in such a manner that the media control portion 12 automatically selects the music to be reproduced according to a predetermined selection program, and corresponding music data is read out of the memory portion 13 and the read out music data is reproduced from the headphone 5 through the voice output portion 16.

The media data means music data obtained by the user through an external memory element or a computer, and such music data are stored in the memory portion 13 so as to be selectively reproducible by an instruction from the user through the input portion 14. The media data includes various information, such as "unique ID", "name", "date of production", "date of renewal", "number of reproduction", "size" and "codec" as header information. The media control portion 12 rewrites the header information if necessary when executing procedures on the media data. For example, the header information of some music data is [001, ABCD, 20080801, 20080808, 012, 1MB, MP3, . . . ] which means the unique ID (or track number, music identification number or the like) is 001, name (or name of music, name of file or the like) is ABCD, date of production is Aug. 1, 2008, date of renewal is Aug. 8, 2008, number of reproduction is 12 times, the size is 1 mega bites, and a kind of codec is MP3. When the reproduction of such music data is executed one more time and total number of the reproduction becomes thirteen times, the media control portion 12 rewrites "number of reproduction" of the header information "012" into "013" by adding one (1) thereto.

3.2 Execution of Game Program

The data control portion 11 of the media reproduction device 1 captures game program from the outside and stores such game program in the memory portion 13. The game execution portion 17 executes the game program based upon a command inputted by the user through the operation panel 4 and the input portion 14. In other words, the game program is read out of the memory portion 13, and the game is executed based upon descriptions of the game program. Well-known methods are used concerning the contents of the game and its execution method in the embodiment if these are not mentioned in the specification.

Figure 4:
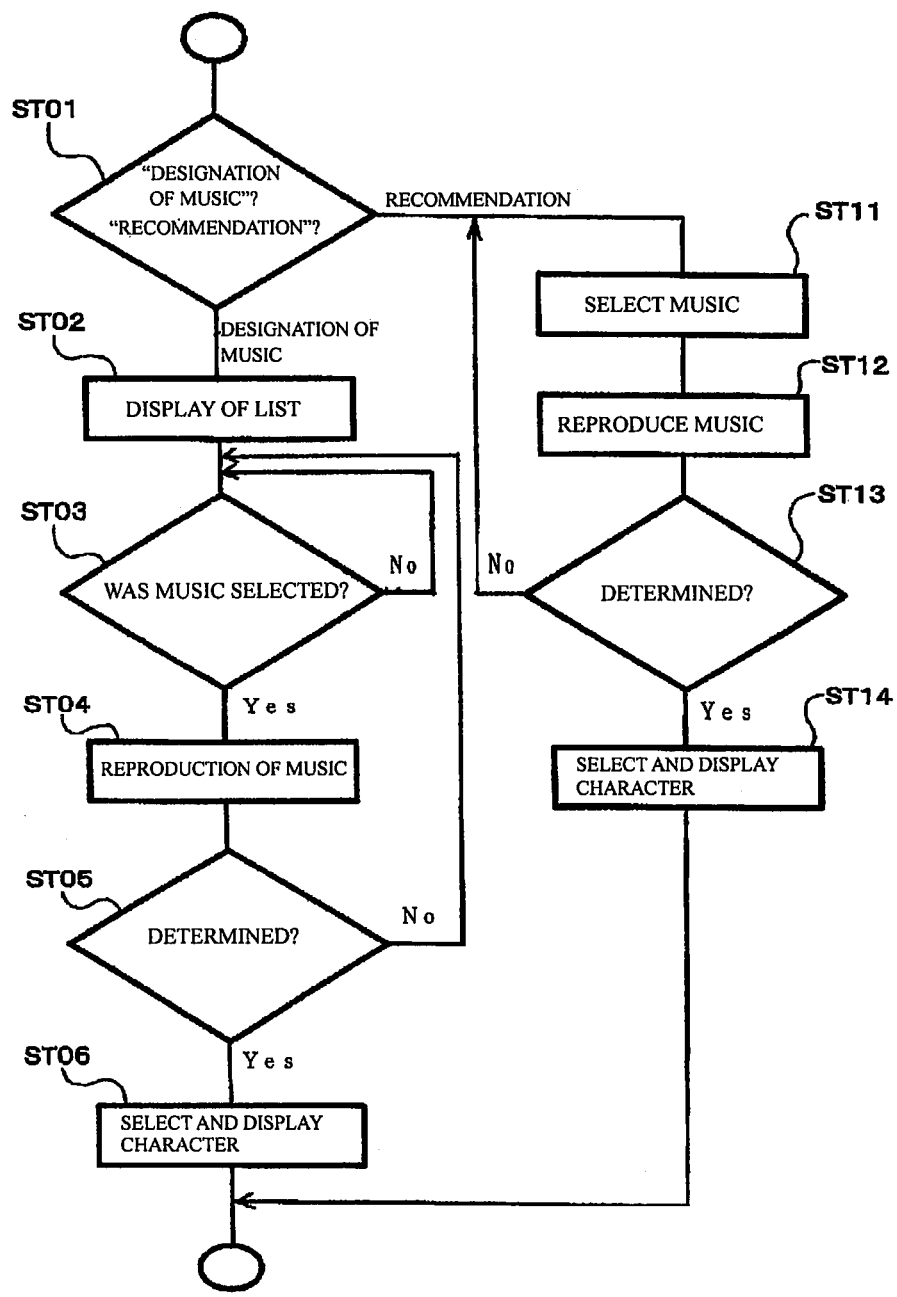
FIG. 4 is a flowchart in connection with production of characters.

According to the game program of this embodiment, it is possible to produce characters in the game. An example of its routines is mentioned, referring to a flowchart in connection with displayed images in FIG. 3 and production of characters in FIG. 4. Firstly, the character producing port ion 18 displays an operation guide as shown in FIG. 3(*a*) through image output portion 15 and the liquid crystal panel 3 (ST01). If the user selects and inputs "designation of music" through the operation panel 4 and the input portion 14, the character producing portion 18 outputs and displays names of music in response to the input out of the header information of music data stored in the memory portion 13 as a list as shown in FIG.

3(b) through the media control portion 12 (ST02). The user selects the music based upon this list by operating the operation panel 4 (ST03). Based upon the inputted selection command, the character producing portion 18 reproduces the music data of the music through the media control portion (ST04), and outputs the music data through the voice output portion 16 and the headphone 5. A screen showing the music which was selected at this time and is being reproduced is displayed as shown in FIG. 3(c). The other method of selecting music may be used. For example, hierarchical categories, such as artists and albums, are selected in order so as to search and display desired music as the method of selecting music. The steps of designating and reproducing music as shown in FIG. 3(a) through FIG. 3 (c) are completely the same as the normal music reproducing steps in the media reproduction device 1, as mentioned before, and the user does the operations similar to a general case of reproducing the music to hear when generating the game element. For this reason, it is possible to start for the user the generation action of the game element, such as the character, without something disharmony feeling. Besides, firmware built in the media reproduction device 1, that is, operation program proper to the media reproduction device can be utilized as it is for FIG. 3(a) through FIG. 3(c), that is, for ST01 through ST04 of FIG. 4, and it is possible to simplify a structure of the program for generating the game element thereby.

The user judges whether or not the character should be generated with this music based upon the reproduction output of the music, and if not (ST05), the user inputs no generation (selects "Return" of FIG. 3) and the program returns to the step ST03 again. If the generation of the character with this music is judged, a determination command is inputted through the operation panel 4 and the input portion 14 ("Determination" in FIG. 3 is selected) (ST05). According to this input, the character producing portion 18 obtains the unique ID from the header information of the music data of the determined music. The character storing portion 19 has a combination table showing the combination between the unique ID that is the media data as shown in FIG. 5 and the character that is the object in advance, and the character producing portion 18 detects the corresponding character based upon the unique ID, referring to the combination table. In an example of FIG. 5, two or more characters are corresponded to one unique ID (for example, the three characters "A", "B" and "C" are corresponded to the unique ID "001"). One character may be selected out of these characters by a drawing procedure, such as a random number drawing. The arrangement of the data in the combination table may be determined by shuffling based upon an individual ID of the media reproduction device 1 and the user information when actuating the game program or installing the game program. By dosing so, the completely different character may be generated if the device is different even if music is the same. So, it is interesting.

The combination table between the unique ID and the character as shown in FIG. 5, that is, the combination table between the unique ID that is the attribution information of the media data and the character that is the object stores the game elements, such as two or more characters, for each music, corresponding to each other. According to the music selected (ST03) by the user through the input portion 14, two or more corresponding characters are selected by the character producing portion 18, and one character is selected out of two or more characters selected, such as the character A1, A2 and A3, at random or according to a predetermined selection standard. Such a combination between the unique ID (attribution information) and the character (object) is not fixed, but is shuffled through the character producing portion 18 with a passage of time (such as, every predetermined playing time of the game, every predetermined reproduction time of music, every reproduction music and every time of power on of the media reproduction device 1, and every start of the game) or the table having a new combination is always generated by randomly reading the object out of many objects stored in the game program in advance and assigning the read object to each unique ID (attribution information). By doing so, even if the user operates the input portion 14 from habit as usual in order to reproduce favorite music at the time of production of the game element, there is a low probability the same game element is produced, and it is possible to produce a new game element with a simple program structure, conforming to the customization state of the music of the user.

The character producing portion 18 produces the table as shown in FIG. 5, assigning each music to two or more game elements so as to correspond to the number of music stored in the memory portion 13 through the user. The game element to be assigned, such as the character, is stored in the game program stored in the memory portion 13 in advance, and the character producing portion 18 reads the game elements the number of which corresponds to the number of music stored in the memory portion 13 through the user, and assigns two or more game elements to each music as shown in FIG. 5 so that the combination table between the music and the game element can be produced.

The more the number of music stored in the media reproduction device 1 through the user is, the more the number of the game elements to be assigned is. Under such a situation, the user has many opportunities of producing more kinds of characters, and it is possible to produce the game elements, reflecting the customization state of the media reproduction device 1 of the user thereby.

As shown in FIG. 3(d), the character producing portion 18 outputs and displays the image of the character selected by determination (ST06). The information, such as the image, is stored in the character storing portion 19, and is set every character by a predetermined character data table (not shown) stored in the character storing portion 19. The information, such as the image corresponding to the character that was selected by the character producing portion 18 is read out and outputted as the image according to such a character table. On this occasion, parameters showing the attribution or ability value of the character during the game are also displayed (only "HP76" is shown in the figure, but two or more kinds of parameters may be shown). The parameter may be set in the character data table every character as a fixed value, or may be produced as a random value having a predetermined value width by adding a proper random coefficient based upon a value obtained from the character data table.

As mentioned above, the character produced by the character producing portion 18 is set so as to be used during the game in the character storing portion 19, and thereafter, the character can be utilized during the game through the game execution portion 17. Then, the character that is the game element can be produced according to the customization state of the media reproduction device 1 through the user, concretely speaking, the state where which music is stored. Therefore, it is possible to exhibit an originality of the user.

Subsequently, a case of selection of "Recommendation" by the user through the operation panel 4 ad the input portion 14 is now mentioned with a display of an operation guide as shown in FIG. 3(a). In such a case, the program proceeds from step ST01 to step ST11 of FIG. 4. In step ST11, the character producing portion 18 selects the music data stored in the memory portion 13 according to the selection of "Recommendation". In such a selection, the character producing portion 18 reproduces the music data of the music through the media control portion (ST12), and outputs such data through the voice output portion 16 and the headphone 5. On this occasion, the screen showing the music that was selected and is reproducing is displayed as shown in FIG. 3(*c*). The music may be selected at random, or based upon the other information, such as status information of the game, present time and the individual ID of the media reproduction device. In step ST12 or later steps, the input for selecting "Determine" or "Return" is judged through the screen of FIG. 3(*c*) (ST13). If "Return" is selected, the program returns to step ST11, and if "Determine" is selected, the character producing portion 18 obtains the unique ID of the determined music, and detects the corresponding character from the combination table, and outputs and displays the image of the character or the like (ST14). If "Recommend" is selected, the music is selected without inclining to user's tastes, and it is possible to enjoy unexpectedness in the production of the character thereby.

As another example to be applied, at the time of the guide display concerning the production of the character (in the step between steps ST01 and ST02 of FIG. 4, for example), a hint to the music to be selected may be displayed. The user selects the music in connection with such a hint. The character producing portion 18 may produce a rare character stored in the character storing portion 19 in such a way that name of music is searched by character string out of the header information of the music data determined in Step ST05, and specific condition is considered to be met if the character string in connection with the hint is found. The rare character means the character as shown in the combination table (referred to as a specific combination table) different from the above-mentioned combination table (referred to as a normal combination table), and the character as shown in the specific combination table is not shown in the normal combination table. Concretely speaking, if the character producing portion 18 displays the hint "designate music in connection with "LOVE!" on the display means, such as the liquid crystal panel 3, the user selects the music including the character string "LOVE" in its title out of a chart of the media data displayed on the display means so as to be selectable as shown in FIG. 3(*b*), and an instruction for selecting this music through the operation panel 4 is outputted to the media control portion 12 and the character producing portion 18 through the input portion 14. The media control portion 12 reproduces the music through the voice output portion 16, and the character producing portion 18 searches the title of the music selected by the user and judges whether or not the character string "LOVE" is included in the title of the music selected by the user. If the name of the music designated by the user through the input portion 14 is "I LOVE YOU", for example, the character string "LOVE" is found. Then, the above-mentioned specific condition is met, and the rare character is produced.

As another example to be applied, the game execution portion 17 may renew the information of the character that was produced by the character producing portion 18 and is usable during the game whenever starting the game program. For example, the character information may include the information of the music designated at the time of producing the character, such as the unique ID, and the number of the reproduction of the music at the time of finish of the last game program. Then, at the time of the start of the game program, the game execution portion 17 obtains the number of reproduction of the music at the present time and computes a difference between such a number and one in the character information so that the value is reflected to the parameter of the character. Concretely speaking, if the number of the reproduction of the music at the time of production is twelve (12) and the number of reproduction of music at the time of start of the game program subsequent to the time of production is 15 (fifteen), its computation is 15−12=3, and the difference three (3) is added to the parameter, such as an ability value and an experience value. In a case where "HP is seventy six (76)" before starting the game program as shown in FIG. 3(*d*) for example, three (3) is added to this value so as to become "HP79". Of course, the computed difference value may not be added as it is, but a value may be reflected to the parameter by another method, based upon the difference value. By doing so, such a method that the more times the music designated at the time of producing the character is reproduced, the stronger the character is may be taken, and it is funny since listening music can be associated with the production of the character. A subject for referring to the number of reproduction is not limited to the music data, but may be the other data, such as stationary image data and moving image data.

The production of the character mentioned above is an example of the production of the object as the game element. Anything, such as an equipment, an arm, an item and parts that are used by the character may be produced as well as the character as long as it is used in the game. In the above-mentioned embodiment, the character is produced based upon the music data, but any information is available in place of the music data as long as the information, such as moving image data, stationary image data, calendar information and text information, can be stored in the media reproduction device.

The invention claimed is:

1. A media reproduction device having a monitor for displaying an image, a memory portion for storing two or more music data, a reproduction output portion for outputting and reproducing music corresponding to the music data and an input operation portion, the media reproduction device being operable to select music to be outputted and reproduced by the reproduction output portion through operation of the input operation portion, said media reproduction device comprising:

game proceeding control means, that can advance a game according to a game program, display an image on said monitor as well as reproduce said music data based upon an input command to be inputted via said input operation portion; and object storing means, for storing a combination table containing a list of attribution information for each of the two or more music data, wherein each attribution information represents an individual music data and each attribution information is corresponded to two or more game elements, wherein the two or more game elements are virtual objects or characters to be used in the game; and object production control means for producing a game elements when a music to be outputted is selected from said two or more music data stored in said memory portion, said object production control means having:

attribution information obtaining means, for obtaining attribution information corresponding to the selected music data;

object selection means, for selecting the game element from the two or more game elements listed in the combination table as being corresponding to said obtained attribution information; and display output means, for setting the selected game element for use in the game.

2. The media reproduction device according to claim 1, further comprising combination table producing means, for changing the combination between said list of attribution information and said two or more game elements in said combination table with a passage of time.

3. The media reproduction device according to claim 1, further comprising:
   music data presentation means, for displaying two or more music data stored in said memory portion, that is reproducible by said media reproduction device on said monitor as a list so as to be selectable for a user, and
   a media control portion that, when a command of selecting some music data from said music data presented by said music data presentation means is inputted through said input operation portion, reads the media data corresponding to the command out of said memory portion and can output and reproduce the music data through said reproduction output portion; and
   said attribution information obtaining means that obtains attribution information relating to said music data selected from said music data that was presented through said music data presentation means.

4. The media reproduction device according to claim 1, wherein the two or more game elements are virtual characters to be used in the game.

5. The media reproduction device according to claim 1, wherein said object production control means produces said one game element when a normal music selection operation is done through said input operation portion during playing in the game.

6. A computer-readable storage medium for storing a program for a computer having
   a monitor for displaying an image,
   a memory portion for storing two or more music data,
   a reproduction output portion for outputting and reproducing music corresponding to the music data and
   an input operation portion, the computer being operable to select music to be outputted and reproduced by the reproduction output portion through operation of the input operation portion, said program, when executed by the computer, making the computer to function as following means:
game proceeding control means, that can advance a game according to a game program, display an image or the monitor as well as reproduce said music data based upon an input command to be inputted via said input operation portion; and
object storing means, for storing a combination table containing a list of attribution information for each of the two or more music data, wherein each attribution information represents an individual music data and each attribution information is corresponded to two or more game elements, wherein the two or more game elements are virtual objects or characters to be used in the game;
said program for further making the computer to function as object production control means, for producing a game element when a music to be outputted is selected from said two or more music data stored in said memory portion, said object production control means having:
attribution information obtaining means, for obtaining attribution information corresponding to the selected music data;
object selection means, for selecting the game element from the two or more game elements listed in the combination table as being corresponding to said obtained attribution information; and
display output means, for setting the selected game element for use in the game.

* * * * *